May 12, 1970 B. A. MacIVER ET AL 3,512,052

METAL-INSULATOR-SEMICONDUCTOR VOLTAGE VARIABLE CAPACITOR WITH CONTROLLED RESISTIVITY DIELECTRIC

Filed Jan. 11, 1968

INVENTORS
Bernard A. MacIver, &
Matthew C. McKinnon
BY Robert J. Wallace
ATTORNEY United States Patent Office 3,512,052

Patented May 12, 1970

3,512,052

METAL-INSULATOR-SEMICONDUCTOR VOLTAGE VARIABLE CAPACITOR WITH CONTROLLED RESISTIVITY DIELECTRIC

Bernard A. MacIver, Lathrup Village, and Matthew C. McKinnon, Warren, Mich., assignors to General Motors Corporation, Detroit, Mich., a corporation of Delaware Filed Jan. 11, 1968, Ser. No. 697,228
Int. Cl. H01l 3/00
U.S. Cl. 317—234 8 Claims

ABSTRACT OF THE DISCLOSURE

A nonlinear capacitor of the metal-insulator-semiconductor type in which inversion of the semiconductor at the insulator-semiconductor interface is prevented. A surface varactor is described in which the insulating layer has a selected moderate resistance and is of a high permittivity dielectric. The specification discloses forming such insulating layers by reactive sputtering.

BACKGROUND OF THE INVENTION

Nonlinear solid state capacitors of metal-insulator-semiconductor laminate have been proposed in the prior art. The capacitance of these devices varies in a predetermined way with the voltage applied to them. Hence, they are voltage variable capacitors. Unfortunately, the capacitance of these devices does not vary sufficiently with applied voltage, or they do not possess a high enough quality factor to permit them to be used more widely. Relatively thick films of oxide are required in order to obtain good, stable, continuous layers. On the other hand, thicker oxide layers in such devices reduce the capacitance change with applied voltage. If such devices had a larger capacitance change, they would be applied more widely in practical electronic circuits. For example, it has been necessary to electronically couple two or more such devices in a tuner to cover an entire AM radio broadcast band. If one such device would satisfactorily cover the entire AM band, these devices would be much more extensively used in radio receivers. Analogously, a higher selectivity in tuning is realized, if the device has a lower dissipation factor.

SUMMARY OF THE INVENTION

It is a principal object of this invention to provide an improved solid state voltage variable capacitor and a method of forming such a capacitor. It is a further object to provide a nonlinear solid state capacitor of unusually high capacitance change and low dissipation factor that is especially suitable for commercial manufacture. A particular object of this invention is to provide an improved metal-insulator-semiconductor nonlinear capacitor suitable for tuning an entire AM radio broadcast band. Another object is to provide a new basis for making nonlinear capacitors of the metal-insulator-semiconductor type, and particularly surface varactors.

The invention comprises an improved variable capacitor particularly a capacitor of the metal-insulator-semiconductor surface varactor type. The insulator of this improved surface varactor is of a high relative permittivity material and is of moderate resistance to permit a sufficient leakage of current through the insulator under applied voltage to prevent inversion of the semiconductor at the semiconductor-insulator interface. A preferred varactor is produced by epitaxially depositing a thin high bulk resistivity semiconductor layer of a low bulk resistivity substrate and then reactively sputtering tantalum oxide onto the epitaxial deposit.

BRIEF DESCRIPTION OF THE DRAWING

Other objects, features and advantages of the invention will become more apparent in connection with the following description of preferred examples thereof and from the drawing, in which.

DESCRIPTION OF THE PREFERRED EMBODIMENTS

Figure 1:
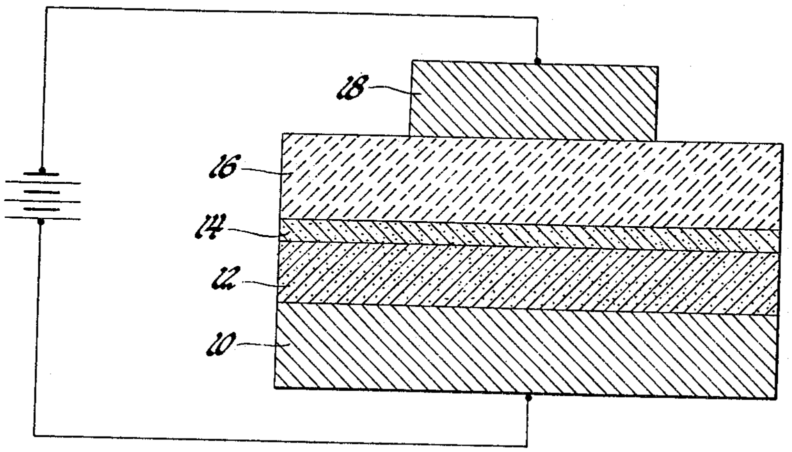
FIG. 1 shows a schematic diagram of a nonlinear capacitor made in accordance with the invention (dimensions not being to scale)

The invention can best be described by initially referring to the drawing in which FIG. 1 shows a preferred example of a solid state voltage variable capacitor suitable for commercial manufacture. The capacitor includes a lower ohmic electrode 10, a layer 12 of low resistivity N-type silicon, a layer 14 of high resistivity N-type silicon, a layer 16 of reactively sputtered tantalum oxide, and an evaporated counterelectrode 18 of aluminum. Dimensions are not to scale. Electrodes 10 and 18 are connected to an electrical source, as shown, for providing a reverse bias to the semiconductor layers 12 and 14.

Electrode 10 can be a layer of evaporated aluminum. However, it is preferred that electrode 10 form a support for the varactor laminate and also serve as a means for removing heat from the assembly in operation. Accordingly, it is preferred that electrode 10 be a relatively thick copper element, such as a base member of an enclosing capsule for the device.

The upper electrode 18 is merely an appropriate ohmic contact to the oxide layer 16. As indicated, it is preferably formed with a coating of evaporated aluminum but any of the other known forms of ohmic contacts could, of course, be substituted as, for example, aluminum paints, gold cermet mixtures, soldered contacts, etc.

In the preferred embodiment, low resistivity layer 12 is actually a slice of semiconductor upon which the capacitor is formed. It principally provides a substrate upon which the much thinner layer 14 can be epitaxially deposited, and then it provides a mechanical support for the epitaxial layer during subsequent processing and assembly of the device. Hence, it should be of the same semiconductor type as layer 14. It should also be of a low enough resistivity to avoid too high a series resistance in the capacitor and yet not so low as to inhibit deposition of a satisfactory epitaxial film thereon. If layer 12 is initially made of a semiconductor slice having a bulk resistivity of about 0.001–0.015 ohm-centimeter, these objectives can be readily realized. The thickness of the slice, layer 12, is preferably about 5 to 10 mils. Wafer thicknesses less than 5 mils are difficult to handle during processing and may provide high loss due to breakage. Thicknesses in excess of about 10 mils provide too high a series resistance in the capacitor and are, therefore, preferably avoided. In general, the thicker the silicon slice used as layer 12, the lower its bulk resistivity must be in order to get optimum results. If slices less than 5 mils can be satisfactorily handled, they are preferred. Materials having a resistivity less than 0.01 ohm-centimeter are preferred if a satisfactory epitaxial deposit can be obtained thereon.

Layer 14 forms the most important semiconductor portion of the metal-insulator-semiconductor capacitor combination. When the capacitor is used, a space charge region is established in the high resistivity layer 14 adjacent the oxide interface, and does not penetrate beyond layer 14 under normal use. Layer 14 should have a bulk resistivity of at least 10 ohm-centimeters if one is to realize a large capacitance variation with voltage. Resistivities in excess of 50 ohm-centimeters generally increase the dissipation factor and are to be avoided.

Layer 14 should be thin. In designing a device for a particular application, the thickness of layer 14 should be kept to a minimum to avoid increasing the series resistance in the varactor. As previously indicated, the semiconductor space charge layer commences at the insulator-semiconductor interface and extends therefrom as reverse bias voltage is applied into the semiconductor layer 14, to a depth which is a function of the voltage applied. The thickness of the high resistivity layer 14 need only be somewhat greater than the maximum depth to which the space charge layer penetrates at the highest voltages which are to be applied. If the thickness of layer 14 is about $3 \times 10^{-3}$ cm., one can fully realize the maximum capacitance change offered by the device. On the other hand, in some instances one may not need the full capacitance change that can be realized. In such instances, it may be preferred to have layer 14 thinner. Layers of silicon, for example, as thin as $5 \times 10^{-5}$ could be used to provide an even lower dissipation factor, at the expense of capacitance change with applied voltage. On the other hand, if the thickness of the high resistivity semiconductor layer is increased above about $10^{-3}$ cm., the series resistance of the capacitor will be increased undesirably, and the dissipation factor increases. For a silicon device used in tuning the AM radio band, a thickness of about $4 \times 10^{-4}$ cm. to $8 \times 10^{-4}$ cm. is preferred.

A very important facet of our invention involves the nature of the insulating layer used in making the capacitor. Oxide layer 16 is of moderate resistance and formed of a high permittivity dielectric. The layer should have a resistance of about $10^4$–$10^6$ ohm-centimeter squared and have a relative permittivity in excess of about 10. Since resistance equals bulk resistivity times length over area, the expression "ohm-centimeter squared" includes the thickness of the layer as well as the bulk resistivity of the material forming it. Reactively sputtered tantalum oxide has been found to be a particularly beneficial material for the insulating layer, and is preferred. Other dielectrics, such as aluminim oxide and the titanates, particularly barium titanate and strontium titanate may be satisfactory in specific applications. However, these other dielectrics have a higher bulk resistivity than those of tantalum oxide. Hence, they must be used as extremely thin films, as for example about 100 angstroms for aluminum oxide, if the insulating layer 16 is to have a resistance of about $10^4$–$10^6$ ohm-centimeter squared. Such thicknesses can be produced by sputtering or the like. Aluminum oxide films can be produced by reactive sputtering. On the other hand, good, stable, continuous films of thicknesess below 500 angstroms are extremely difficult to form, particularly under commercial manufacturing conditions. Accordingly, while it is possible to achieve the benefits of the invention with high permittivity dielectrics having bulk resistances greater than tantalum oxide, they are not preferred.

It has been found that reactively sputtered tantalum oxide has a moderate bulk resistivity of approximately $10^7$–$10^9$ ohm-centimeters and a relative permittivity of approximately 25. Moreover, its moderate bulk resistivity, as will subsequently be developed, permits its use in layers of about 500–1500 angstroms, which are thick enough to be readily produced under commercial manufacturing conditions as good, stable, continuous coatings having a resistance of about $10^4$–$10^6$ ohm-centimeter squared. These films are good if they exhibit no pin holes, and are considered stable if they are of uniform thickness. Of course, they must be continuous.

In essence, then, this invention deliberately employs an insulating layer which allows a moderate leakage current to flow through it under an applied voltage. We have found that a limited leakage enhances capacitance change not otherwise available in the device. It appears that the insulating layer must be of the described resistance to provide the desirsed leakage current to prevent inversion of the semiconductor at the insulator-semiconductor interface under higher applied voltages. The leakage current apparently prevents inversion by a recombination process in which the minority charge carrier density is effectively reduced in the potential inversion region. In any event, at higher applied voltages, capacitance unexpectedly continues to decrease, instead of becoming constant or increasing, indicating that the space charge region is continuing to expand further into the semiconductor. If the resistance of the insulating layer is less than about $10^4$ ohm-centimeter squared, leakage current can become so large that the power density (i.e. $I^2R \times$volume) in the dielectric reaches a destructive value and "shorts out" the dielectric. On the other hand, if the resistance of the oxide layer is in excess of about $10^7$ ohm-centimeter squared, no synergistic effect due to leakage current has been observed. Reactively sputtered coatings of tantalum oxide in thicknesses of about 500–1500 angstroms provide the appropriate leakage current.

Figure 2:
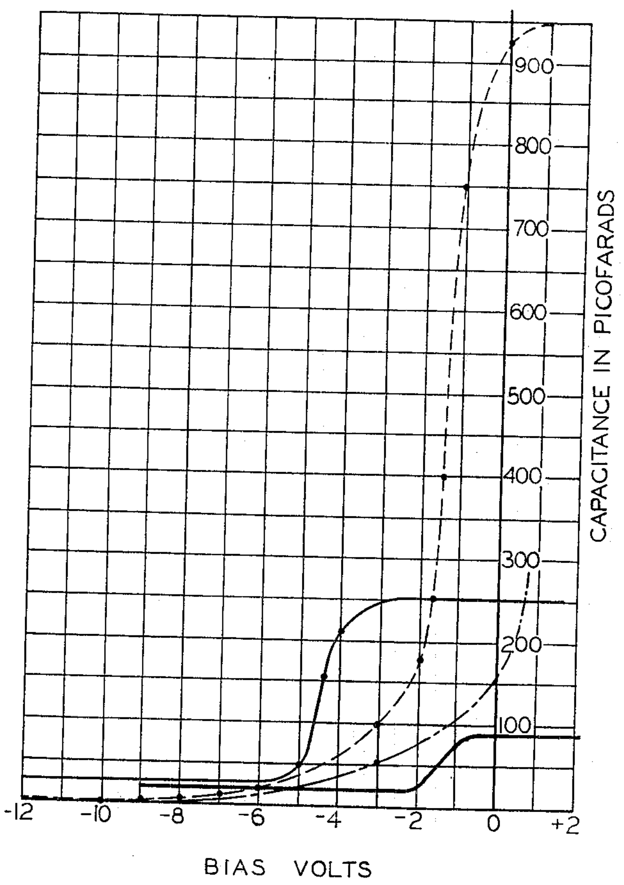
FIG. 2 shows a number of superimposed curves in which the change in capacitance with applied voltage of a device made in accordance with the subject invention is compared with currently available variable capacitors.

FIG. 2 shows a graph in which the reverse bias voltage at a frequency of about 100 kHz., is plotted as the abscissa with capacitance in picofarads as the ordinate. The curve formed by a series of dashes shows the change in capacitance of a surface varactor having a 1000 angstrom reactively sputtered tantalum oxide insulator made substantially in accordance with the method hereinafter described. The curve formed by the heavy solid line represents the change in capacitance with voltage of a similar surface varactor which has a 1000 angstrom silicon oxide layer substituted for the aforementioned tantalum oxide layer. The curve formed by the light solid line represents a similar surface varactor having a 350 angstrom silicon dioxide insulator. The curve formed by the series of alternate dots and dashes represents the change in capacitance with voltage of a junction varactor (a back biased diode) specially designed for variation of capacitance with applied voltage.

As can be seen from the curves shown in FIG. 2, junction varactors provide a continuing change in capacitance with voltage. However, the initial capacitance of such devices is quite low. The thinner silicon dioxide surface varactor has a higher initial capacitance but little initial change in capacitance. Moreover, the change it does exhibit is only over a very limited range in voltage, and the ratio of maximum capacitance to minimum capacitance is quite small. The thicker silicon dioxide device exhibits even poorer characteristics.

On the other hand, the surface varactor made with the tantalum oxide moderate leakage current insulator has a maximum capacitance about four times greater than that of the thinner silicon dioxide surface varactor. Moreover, the minimum capacitance is lower and continues to change at higher reveres bias in substantially the same way as the junction varactor.

A preferred commercial method of making a capacitor in accordance with the invention commences with a 0.01 ohm-centimeter N-type silicon slice of about 5 mils in thickness. The slice is lapped, polished, and cleaned. An epitaxial film, about 8 microns thick, of 15 ohm-centimeters N-type silicon is epitaxially deposited on a surface of the silicon slice in any of the normal and accepted manners. Thereafter, the coated wafer is cleaned, and placed in a vacuum chamber for sputtering. Any of the commercially available sputtering apparatus can be used. The coated slice is made the anode in a sputtering system in which the cathode is a tantalum disk. The vacuum chamber is evacuated and the atmosphere replaced with dry oxygen at a pressure of about 250 microns of mercury. A high electric field of about 500 volt-centimeters is impressed between the anode and cathode, inducing ionization of the oxygen atoms to commence the reactive sputtering. The positive oxygen ions bombard the cathode releasing tantalum atoms from the cathode surface. The tantalum atoms travel through the oxygen plasma, and are deposited on the semiconductor epitaxial coating as tantalum oxide. The rate of reactive sputtering is not particularly critical but we prefer a rate of about 1500 angstroms per hour. After the desired thickness of reactively sputtered tantalum oxide is achieved, sputtering is discontinued. Thereafter, the sputtering chamber is backfilled with air and the tantalum oxide-semiconductor laminate removed from the chamber. An aluminum counterelectrode is then deposited over the tantalum oxide film by evaporation through mask. If miniature capacitors are desired, a plurality of small counterelectrodes are simultaneously deposited through the mask. The wafer is then scribed and broken to form individual dies. The large slice, or a die, is then bonded to a supporting metal header, which serves as the ohmic contact to the semiconductor. The assembly can then be potted in plastic or enclosed in any other suitable way, after an appropriate terminal lead to the aluminum counterelectrode is provided.

It is to be understood that while this invention has been described principally in connection with N-type silicon, it is to be appreciated that the concepts of this invention are equally applicable to P-type silicon. However, for some applications, N-type silicon may be preferred because of the higher mobility of electrons. Analogously, the invention is not limited to only silicon semiconductors. It is equally applicable to other elemental semiconductors, such as germanium, and to compound semiconductors, such as indium antimonide, gallium arsenide, silicon carbide and the like. Further, there are indications that nonuniform resistivities in the high resistance semiconductor layer may even further enhance the benefits of the invention. Accordingly, no limitation is intended by the foregoing description of preferred embodiments of the invention except as defined in the appended claims.

We claim:

1. In a voltage variable, solid state capacitor having metal-insulator-semiconductor stacked layers, the improvement comprising said insulator layer having a resistance between the metal and semiconductor layers of at least $10^4$ ohm-centimeter squared and including conducting means for allowing sufficient leakage current to prevent conductivity-type inversion of the semi-conductor surface adjoining the insulator, and said insulator layer having a relative permittivity of at least 10.

2. The voltage variable, solid state capacitor defined in claim 1 wherein the insulator layer is of a dielectric having a resistance of about $10^4$–$10^6$ ohm-centimeter squared and a relative permittivity greater than 10.

3. The voltage variable, solid state capacitor defined in claim 1 wherein the insulator layer is of a dielectric having a relative permittivity greater than 10, and a conductivity high enough to prevent inversion of the semiconductor at the semiconductor-insulator interface but low enough to prevent current passing through the insulator from reaching a destructive value that will short circuit the capacitor.

4. The voltage variable, solid state capacitor defined in claim 1 wherein the insulating layer is of tantalum oxide and is approximately 500–1500 angstroms thick.

5. A nonlinear capacitor having first and second electrodes respectively contacting opposite faces of a dielectric-semiconductor laminate therebetween, said laminate comprising a moderate resistivity layer of a dielectric having a bulk resistivity of about $10^7$–$10^9$ ohm-centimeters and a relative permittivity greater than about 10, and contiguous the dielectric layer a layer of a high resistivity semiconductor selected from the group consisting of silicon and germanium, the bulk resistivity of said semiconductor being greater than about 10 ohm-centimeters.

6. The nonlinear capacitor as defined in claim 5 wherein the semiconductor portion of said dielectric-semiconductor laminate is supported on one face of a wafer of a low resistivity semiconductor and the respective electrode for the high resistivity layer oppositely contacts the other face of said wafer, the semiconductor wafer being of the same semiconductor as the high resistivity layer, of the same conductivity type, and having a bulk resistivity less than 0.01 ohm-centimeter.

7. The nonlinear capacitor as defined in claim 5 wherein the semiconductor is silicon and the dielectric is tantalum oxide.

8. A surface varactor having a capacitance change suitable for tuning the entire AM radio broadcast band comprising a first electrode, a wafer of low resistivity N-type silicon on said first electrode, the resistivity of said wafer being about 0.001–0.015 ohm-centimeter, an epitaxially deposited layer of high resistivity N-type silicon on said wafer, said epitaxially deposited layer having a thickness of about $4 \times 10^{-4}$ cm. to $8 \times 10^{-4}$ cm., and a bulk resistivity of about 10–50 ohm-centimeters, a layer of reactively sputtered tantalum oxide on said epitaxial layer, said tantalum oxide layer having a thickness of about 500 to 1500 angstroms, and a second electrode on said tantalum oxide layer.

References Cited

UNITED STATES PATENTS

| | | | |
|---|---|---|---|
| 2,822,606 | 2/1958 | Yoshida | 317—238 X |
| 2,826,725 | 3/1958 | Roberts | 317—238 |
| 2,836,776 | 5/1958 | Ishikawa et al. | 317—238 X |
| 3,149,395 | 9/1964 | Bray et al. | 317—234 X |
| 3,202,891 | 8/1965 | Frankl | 317—258 |

OTHER REFERENCES

Sensitive Semiconductor Capacitor by Robert D. Larrabee, RCA Technical Notes, TN No. 417, January 1961 (sheets 1 and 2).

JAMES D. KALLAM, Primary Examiner

U.S. Cl. X.R.

317—238